United States Patent
Bates et al.

(10) Patent No.: US 6,810,408 B1
(45) Date of Patent: Oct. 26, 2004

(54) METHOD AND APPARATUS FOR CONTROLLING CASCADING E-MAIL DISTRIBUTION

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 09/584,292

(22) Filed: May 31, 2000

(51) Int. Cl.[7] .............................................. G06F 15/16
(52) U.S. Cl. ..................... 709/200; 358/1.15; 358/400; 379/100.08; 379/100.13; 379/102.04; 705/26; 709/201; 709/205; 709/206; 709/219; 709/239; 713/152; 713/400
(58) Field of Search ........................ 709/201, 204–206, 709/219, 239, 245

(56) References Cited

U.S. PATENT DOCUMENTS

| | | | | |
|---|---|---|---|---|
| 4,866,668 A | * | 9/1989 | Edmonds et al. | ........... 711/148 |
| 5,265,033 A | * | 11/1993 | Vajk et al. | |
| 5,333,152 A | * | 7/1994 | Wilber | |
| 5,754,306 A | * | 5/1998 | Taylor et al. | |
| 5,757,669 A | * | 5/1998 | Christie et al. | |
| 5,870,545 A | * | 2/1999 | Davis et al. | |
| 6,128,655 A | * | 10/2000 | Fields et al. | |
| 6,178,460 B1 | * | 1/2001 | Maddalozzo, Jr. et al. | |
| 6,247,135 B1 | * | 6/2001 | Feague | |
| 6,356,886 B1 | * | 3/2002 | Doyle | |

* cited by examiner

*Primary Examiner*—Hosain Alam
(74) *Attorney, Agent, or Firm*—Moser Patterson & Sheridan, LLP

(57) ABSTRACT

A method, apparatus and an article of manufacture for providing cascade distribution of electronic mail comprising creating an electronic mail message having a flag to identify the electronic mail message as a cascade-type electronic mail message or a cascade forward-type electronic mail message; and forwarding a received cascade-type electronic mail message or a received cascade forward-type electronic mail message.

As such, a retraction can be sent with respect to a previously sent electronic mail message, and the retraction will be cascaded to all recipients of previous message as well as to all the recipients of forwarded versions of the previous message.

27 Claims, 7 Drawing Sheets

METHOD AND APPARATUS FOR CONTROLLING CASCADING E-MAIL DISTRIBUTION

BACKGROUND OF THE INVENTION

1. Field of the Invention

The invention generally relates to electronic mail systems and, more particularly, the invention relates to a method and apparatus for distributing electronic mail.

2. Background of the Related Art

In today's electronic mail (e-mail) environment many users either reply or forward the entire contents of received e-mail messages to a variety of users. The downside of distributing e-mail in such a manner is that the original sender has no control over who receives the forwarded messages. A single e-mail message that is sent to one person may be forwarded to others and then forwarded to even more people in a cascade distribution of the electronic mail. If the original sender retracts the e-mail statement and sends the retraction to the original recipient of e-mail, there is no certainty that the retraction will be passed on to all of the recipients of the original electronic mail message.

Therefore, a need exists in the art for a method, an article of manufacture and an apparatus for controlling cascade electronic mail distribution.

SUMMARY OF THE INVENTION

The invention provides a method, apparatus and an article of manufacture for providing cascade distribution of electronic mail comprising creating an electronic mail message having a flag to identify the electronic mail message as a cascade-type electronic mail message; and forwarding received cascade-type electronic mail message to recipients in a recipients list. The invention also creates an electronic mail message having a flag to identify the electronic mail message as a cascade forward-type electronic mail message; and automatically forwards received cascade forward-type electronic mail message to recipients in a forwarded mail log.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

Figure 1:
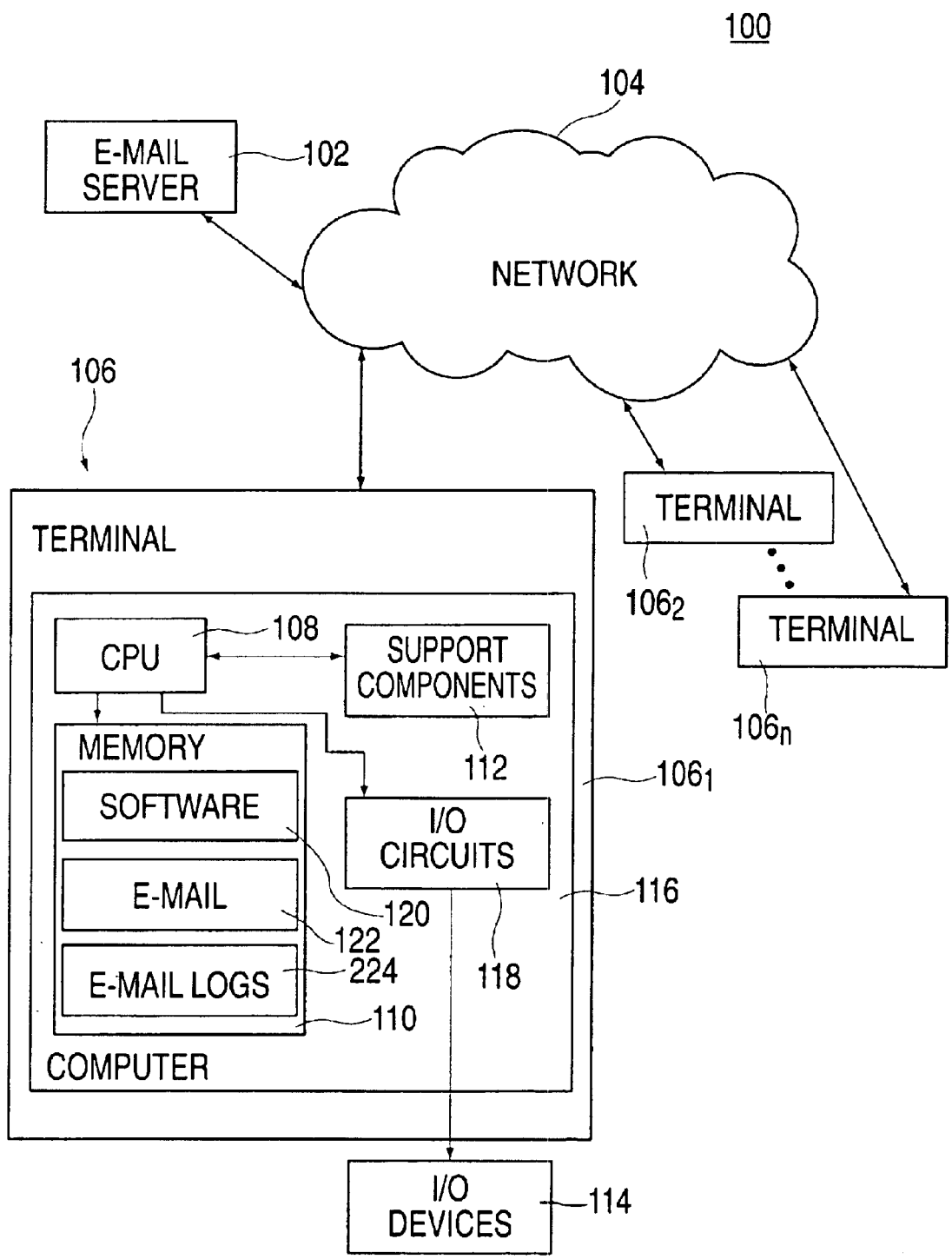
FIG. 1 depicts a simplified block diagram of an electronic mail system that benefits from the present invention.

FIG. 1 depicts an electronic mail (e-mail) system 100 that benefits by use of the present invention. The system 100 comprises an e-mail server 102, a network 104 and a plurality of user terminals $106_1$, $106_2$, . . . $106_n$. The terminals 106 may include data processing systems, computer systems, e-mail terminals, e-mail enabled network appliances and the like. The present invention is embodied in an executable software routine that generally resides within the user terminal 106. The user terminals 106 are connected to one another through the network 104 and also connected through the network 104 to the e-mail server 102. The e-mail server 102 provides e-mail services to all of the user terminals 106 such that the e-mail addressed from one terminal to another is routed through the network to the e-mail server. The e-mail server 102 then properly addresses the e-mail to an appropriate user terminal 106. Although the system is shown as having a hub and spoke configuration, other forms of networks may also benefit from the invention.

Each user terminal 106, e.g., a general purpose computer, comprises a computer 116 and an input/output (I/O) device or devices 114 such as a monitor, a keyboard, a mouse, a trackball and the like. The computer 116 comprises a central processing unit 108, support components 112, and a memory 110. The memory 110 may be a solid state memory, a disk drive, an optical memory, a removable memory device, or a combination of any of these components. The I/O circuits 114 provide a well known interface from the CPU 108 to the I/O devices 114. Also, the I/O circuits 118 generally contain a network interface card or modem that couples the computer to the network of FIG. 1 such that the e-mail messages can be routed to and from the computer 116. The support components 112 are well known in the art and include such components as cache, power supplies, clock circuits, and the like. The combinations of all of these components forms a general purpose computer that, when executing a particular software package or routine, becomes a specific purpose computer. In this case, the CPU 108 when executing the electronic mail processing software 120 of the present invention operates as an e-mail processor. The e-mail software 120 resides in memory 110. In addition, e-mail messages 122 and e-mail logs 124 are also stored within memory 210.

As will be described in detail below, one embodiment of the invention is implemented as a program product for use with a computer system such as, for example, this system 100 of FIG. 1. The programs of the program product defines functions of the preferred embodiments and can be contained on a variety of signal bearing media, which include, but are not limited to (1) information permanently stored on a nonwritable storage media (e.g., read-only memory devices within a computer such as a CD ROM disk readable by a CD ROM drive), (2) alterable information stored on writable storage media (e.g., floppy disks with a diskette drive or hard disk drive), or (3) information conveyed to a computer by a communications medium, such as through a computer or telephone network, including wireless communications. Such signal bearing media, when carrying computer readable instructions that direct the functions of the present invention, represent embodiments of the present invention.

Within each terminal, when the CPU 108 is executing the software 120, the electronic mail processor is formed and will both generate cascade enabled electronic mail and also process received cascade enabled electronic mail.

Figure 2:
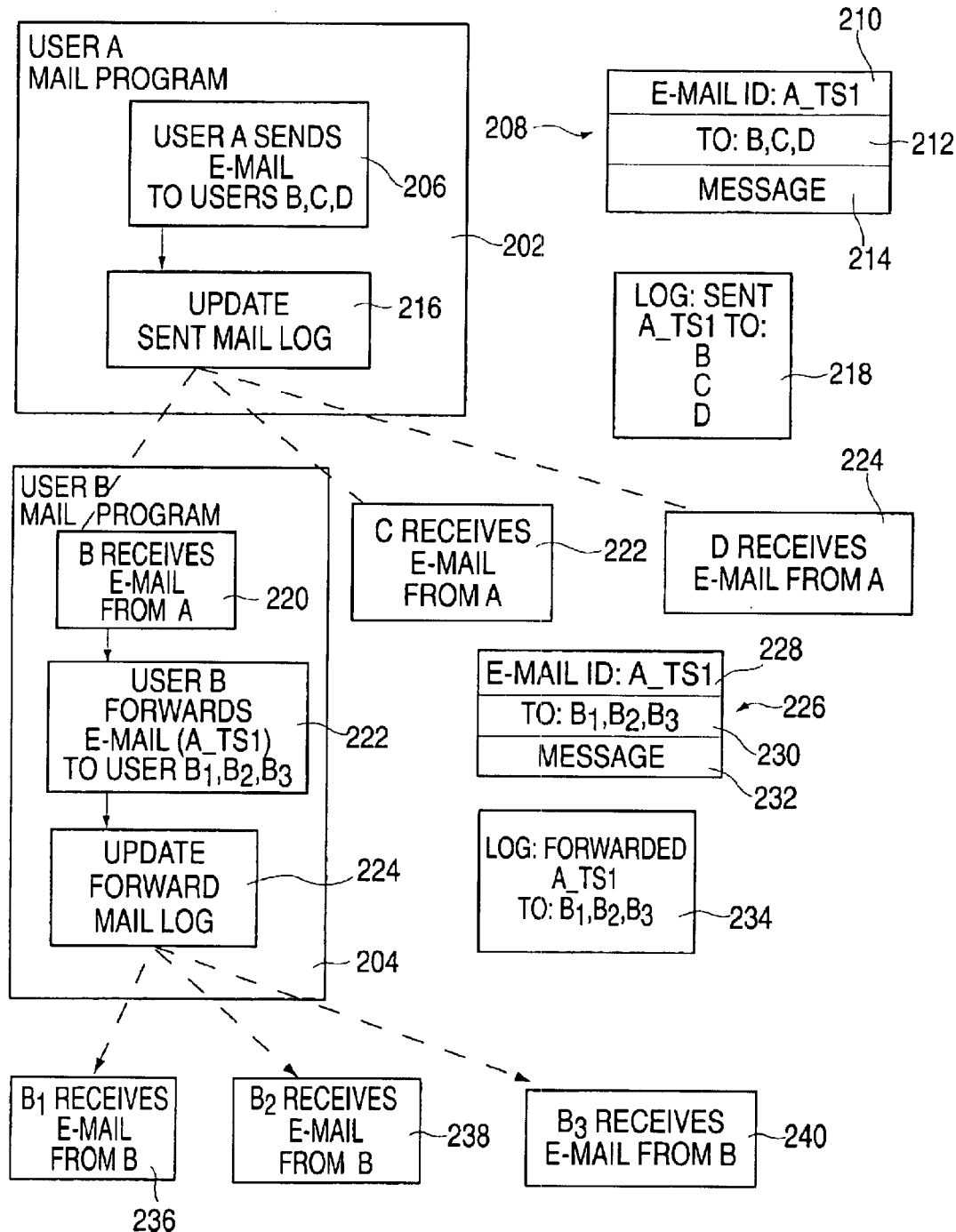
FIG. 2 depicts a flow diagram of a process for controlling cascade e-mail distribution.

FIG. 2 depicts a flow diagram of the process by which electronic mail is cascade distributed to a plurality of users. The mail program of the first user (user A) is represented by reference number 202 and a mail program of user B is represented by reference number 204. Through the user A mail program, user A, at step 206, sends an electronic mail message to users B, C and D. The mail message 208 comprises an e-mail identification (ID) field 210, a recipient's list 212 and the e-mail message itself 214. The electronic mail ID identifies user A and a time-stamp (TS1) that uniquely identifies when the mail message was sent. The recipients list 212 contains the addressees of the e-mail message, users B, C and D. At step 216, user A's mail program 202 updates the sent mail log 218 to identify that the mail message was sent, what the e-mail ID of that mail message was, and also who the addressees were. User A's mail program sends the mail to users B, C and D mail programs. At steps 220, 222 and 224, the mail programs of users B, C and D respectively receive the e-mail message from user A. The details of receiving and processing the electronic mail in accordance with the present invention is shown with respect to user B's mail program 204. The mail programs for users C and D operate in the same manner as described below with respect to user B's mail program.

At step 220, user B receives an e-mail message from user A. At step 222, user B forwards the e-mail that he receives from user A to users B1, B2 and B3. The mail message 226 that is sent from user B to users B1, B2 and B3 contains the e-mail identification of the forwarded mail A_TS1 in field 228, the recipients' list in field 230 and the e-mail message in field 232. At step 224, the user B's mail program 204 updates the forwarded mail log 234. At steps 236, 238 and 240, users B1, B2 and B3 respectively receive the forwarded electronic mail message from user B. As such, the original message sent by user A has now cascaded through user B to users B1, B2 and B3. The method of the present invention, as described further below, enables user A to send a retraction of the message or a clarification of the message that was originally sent to user B and have that message automatically forwarded to any of the additional cascade recipients such as users B1, B2 and B3.

Figure 3:
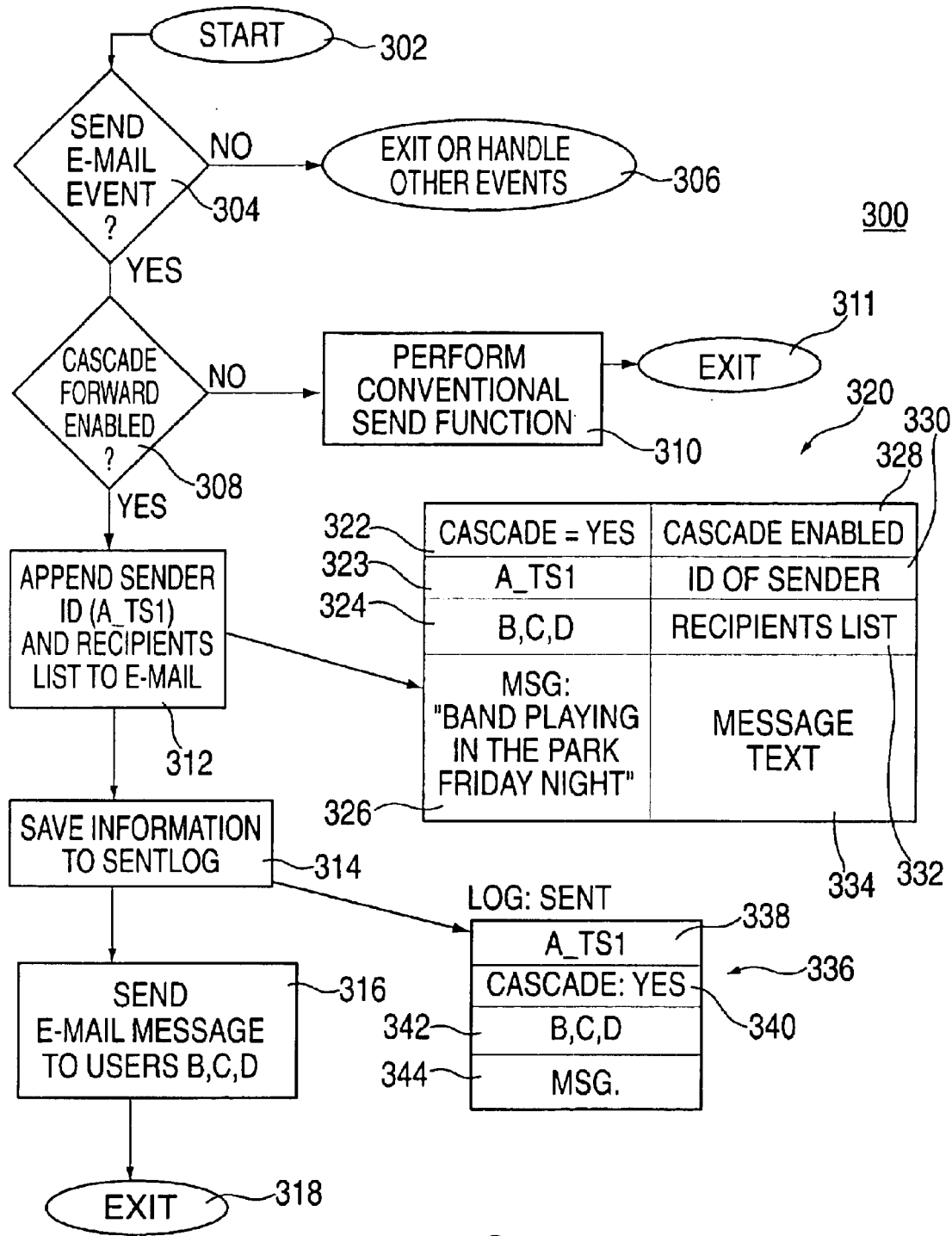
FIG. 3 depicts an electronic mail program for the sender of an electronic mail message having a controlled cascade e-mail distribution.

FIG. 3 depicts a flow diagram of the operation of user A's mail program to send cascade enabled e-mail to, for example, users B, C and D. The program starts at step 302 and proceeds to step 304. At step 304, the method 300 (a portion of mail program 202) queries whether a send mail event has occurred. The method 300 is event driven such that an event will cause multiple steps to be performed within the e-mail message. If a send e-mail event has not been detected, the method 300 proceeds to either exit or handle other events that may occur at step 306. If a send e-mail event has occurred at step 304, the method proceeds to step 308 where the method queries whether the e-mail program is cascade forward enabled. Cascade forward enabling occurs by the user selecting the cascade forward feature to be active. If the feature is not active, the method 300 proceeds to step 310 where conventional send functions are performed to send an e-mail message. At step 311, the program then exits.

If the e-mail program 300 is cascade forward enabled at step 308, the method proceeds to step 312 where the sender ID, for example, A_TS1, is appended to the electronic mail message and a recipients' list is also appended to the e-mail message. E-mail message 320 depicts an exemplary message created as a cascade forward enabled mail message. The electronic mail message comprises a cascade enabled field 328 which contains a "yes" flag 322 to identify that the e-mail message is cascade forward enabled; item 323 is the ID of sender field 330; item 324 is the recipients' list 332; and item 326 is the message text 334 that is sent within the electronic mail message At step 314 of the method 300, the information from the electronic mail message is saved in the sent log 336. The sent log 336 contains the sender ID 338, the cascade enable flag 340, the recipients' list 342 and the e-mail message 344. The method 300 then proceeds to step 316 where the e-mail message is sent to users B, C and D. The method 300 ends at step 318.

Figure 4:
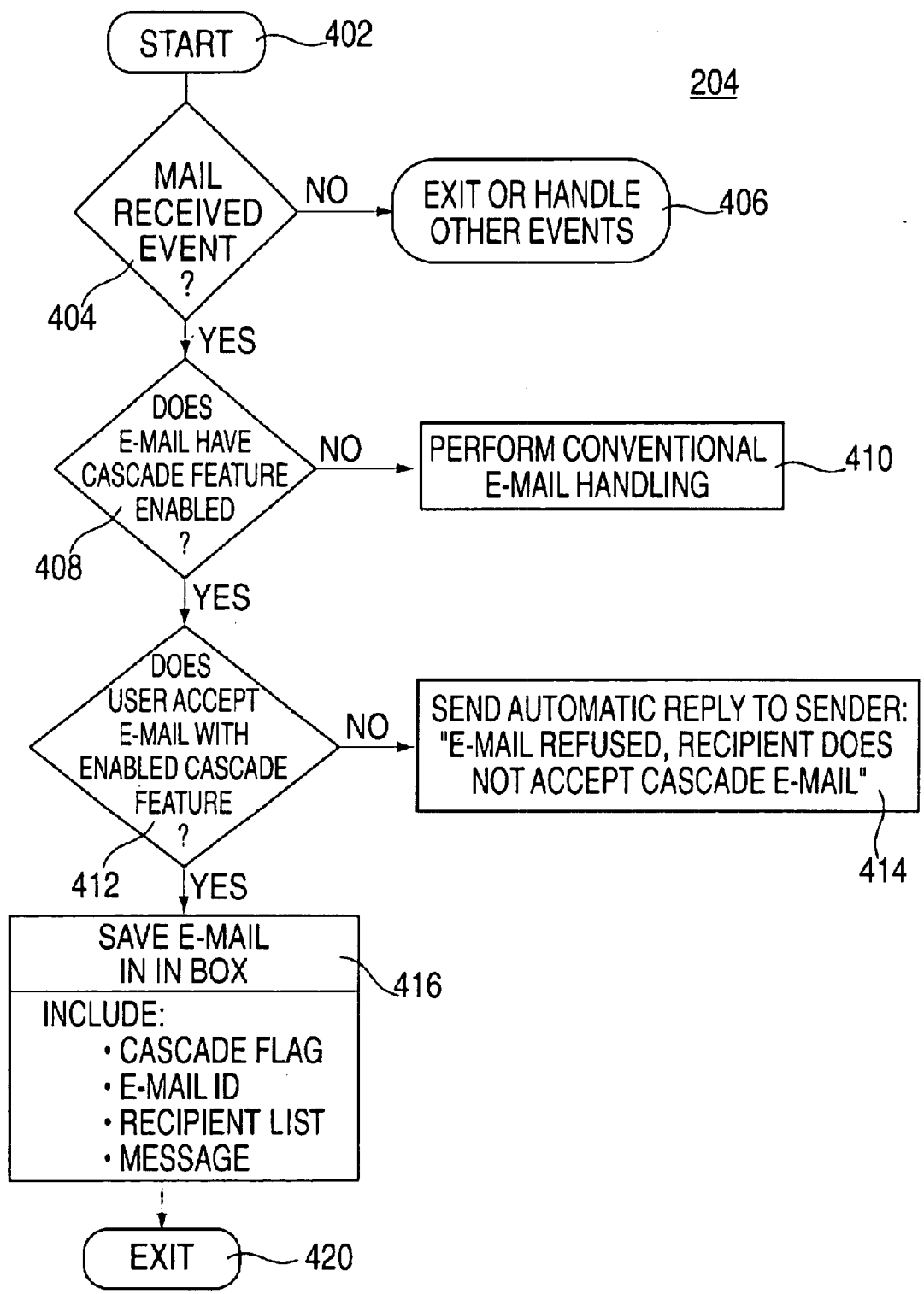
FIG. 4 depicts a flow diagram of an electronic mail program having the capability of handling cascade enabled e-mail.

FIG. 4 depicts a method 400 of the e-mail program 204 of user B. The method 400 starts at step 402 and proceeds to step 404. At step 404, the method 204 queries whether a mail received event has occurred. If the mail received event has not occurred, the method 204 proceeds to step 406 where the method is exited or proceeds to handle other events. If the query at step 404 is affirmatively answered, the method 400 proceeds to step 408 where the method queries if the received e-mail has the cascade feature enabled. To identify the cascade feature being enabled, the electronic mail program looks for a "yes" in the cascade enabled field of the message. If the cascade feature is not enabled, the method 400 proceeds to step 410 where the method performs conventional electronic mail handling. If the received e-mail is cascade enabled, the method 204 proceeds to step 412. At step 412, the method 400 checks whether the user's electronic mail program is set up to accept cascade enabled electronic mail. For example, a user may select not to accept cascade enabled mail such that their terminal will not pass on cascade forwarded mail to others. If the user does not accept cascade enabled mail, at step 414, the mail method 204 sends an automatic reply to the sender of the e-mail indicating that the e-mail was refused because the recipient does not accept cascade e-mail. If the method 204 is cascade enabled and accepts cascade enabled mail, the method 204 proceeds to step 416 wherein the electronic mail is saved to the user's in-box including the cascade flag, the e-mail ID, the recipients' list and message itself. At step 420, method 400 ends.

Figure 5:
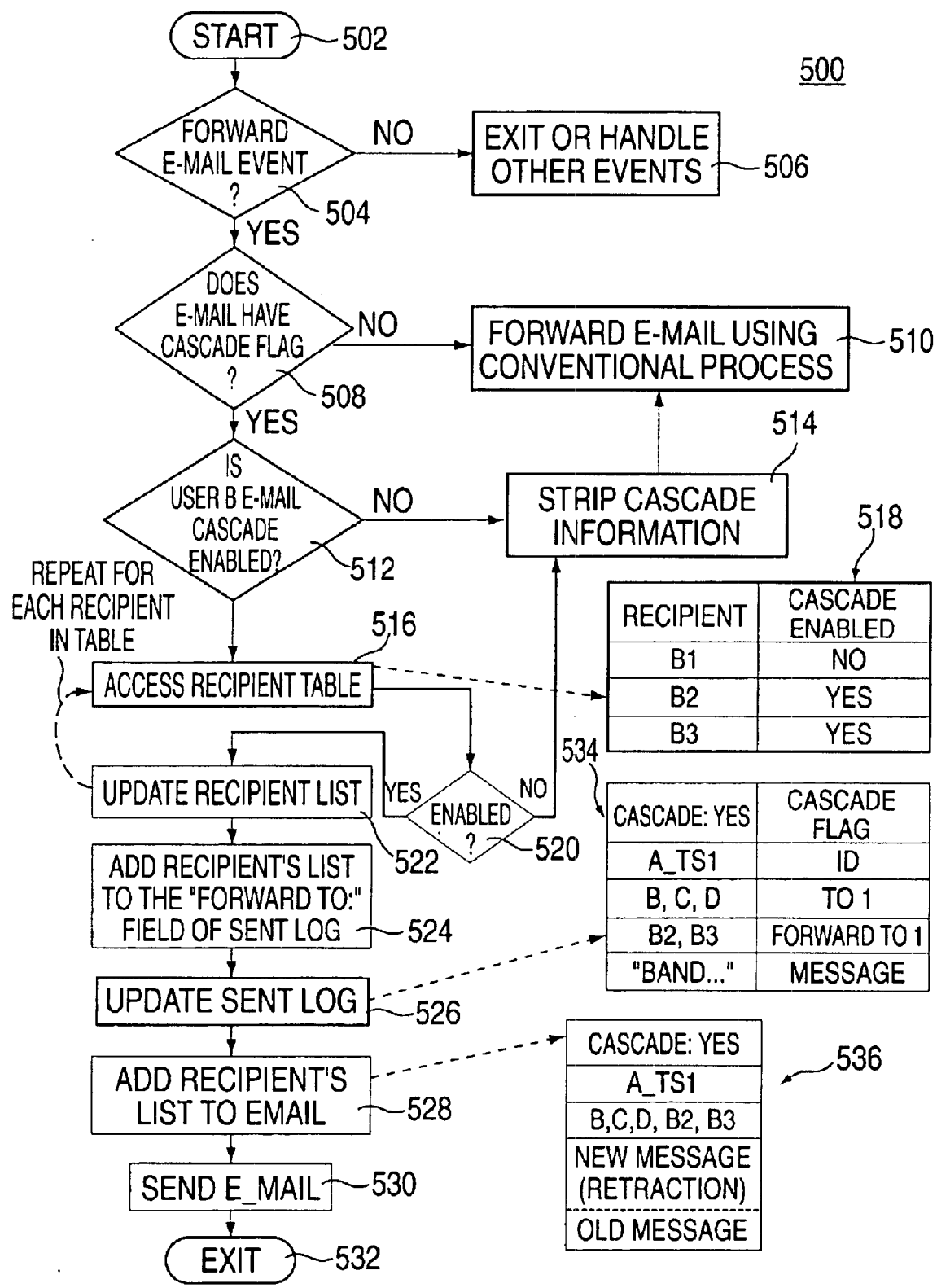
FIG. 5 depicts a flow diagram of a forwarding function for an e-mail program having a cascade enabled function.

FIG. 5 depicts a flow diagram of another method 500 of user B's electronic mail program 204. This method 500 is for handling and forwarding cascade forward type e-mail. The method starts at step 502 and proceeds to step 504. At step 504, the method 500 queries whether a forward e-mail event has occurred. If the forward e-mail event has not occurred, the program 500 proceeds to step 506 where the method exits or handles other events. If the query at step 504 is affirmatively answered, the method 500 proceeds to step 508. At step 508, the electronic mail program method 500 queries whether the e-mail is cascade enabled. If not, at step 510, the electronic mail is forwarded using a conventional process.

If the query at step 508 is affirmatively answered, the method 500 proceeds to step 512. At step 512, the method queries whether user B's electronic mail program is cascade enabled. If it is not cascade enabled, at step 514, the method 500 strips all of the cascade information from the received e-mail message and then forwards the e-mail message using a conventional forwarding process at step 510. If the user B's electronic mail program is cascade enabled, the method 500 proceeds to step 516.

At step 516, the method 500 enters a loop that will identify which of the recipients that the user B will forward mail to are cascade enabled. In one embodiment, a recipient table 518 contained within the electronic mail program identifies a plurality of recipients that user B forwards e-mail to and whether each one of those users are cascade enabled. In this case, the recipients are B1, B2 and B3, where B1 is not cascade enabled while users B2 and B3 are cascade enabled. At step 522, routine 500 checks for the enablement of each recipient in the recipient table 518. If any recipient is not enabled, the routine proceeds to step 514 wherein the cascade information is stripped from the e-mail message and the e-mail message is forwarded using conventional processes of step 510. If the user is cascade enabled, the method proceeds to update the recipient list for the forwarded e-mail at step 522. At step 524, the recipients' list generated in step 522 is added to the "Forward To" field of the sent log and the sent log 534 is updated at step 526. The log 534 contains the cascade enabled flag, the e-mail ID, the "To" field list that contains users B, C and D, the "Forward To" list that contains users B2 and B3 and the e-mail message. At step 528, the recipients' list is added to the e-mail such that the e-mail message now looks like message 536. In the e-mail message 536, the "To" field now contains users B, C, D, B2 and B3 as the recipients of the forwarded e-mail. At step 530, the e-mail is sent to users B, C, D, B2 and B3 and the mail program is exited at step 532. In this manner, the retraction that is sent from user A can be routed to the other users that have had mail forwarded to them by having the e-mail program review the information in the sent log of user B.

Figure 6:
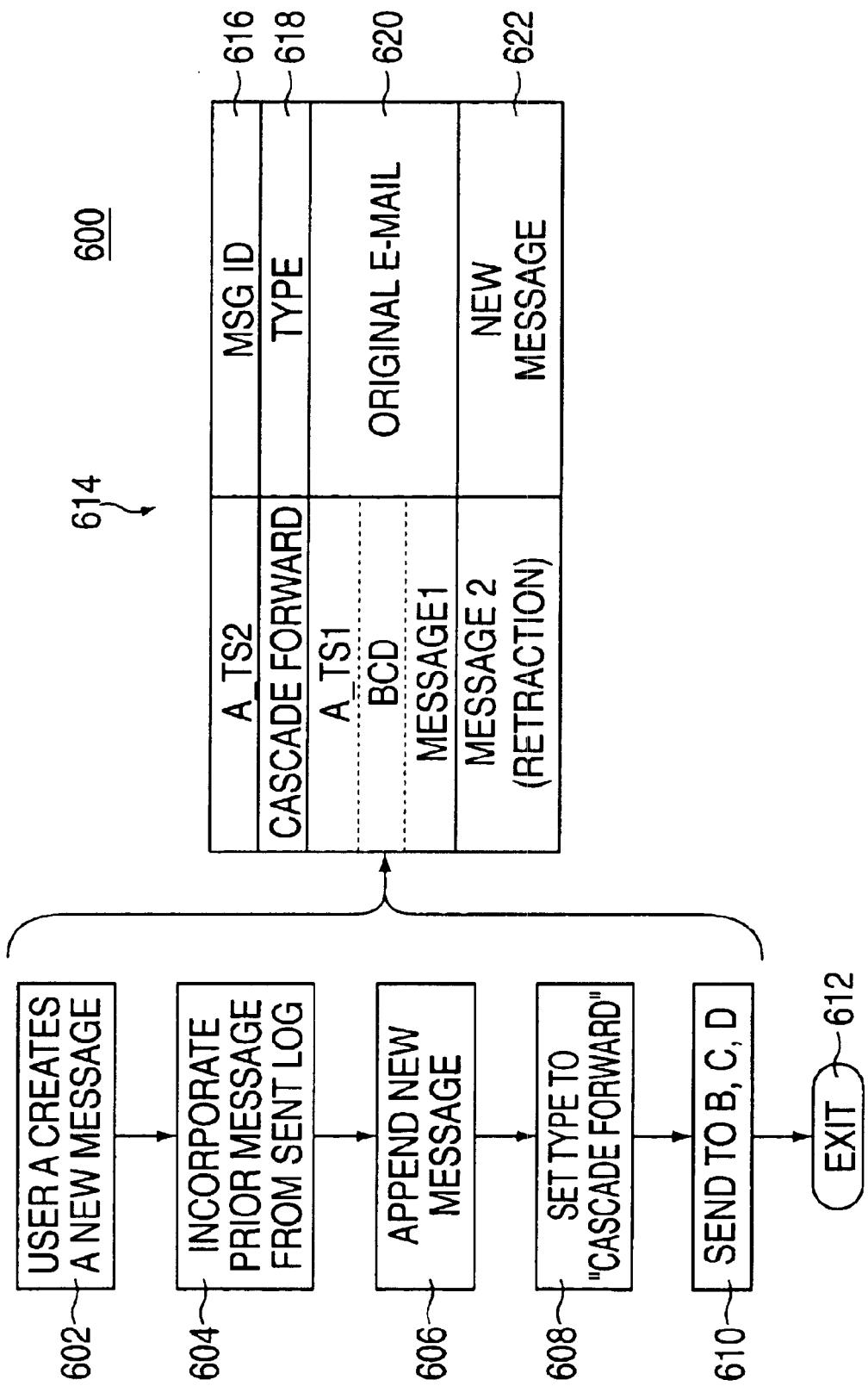
FIG. 6 depicts an electronic mail program process for retracting a previously mailed e-mail message.

FIG. 6 is a flow diagram of a method 600 of user A's electronic mail program when user A sends a retraction to users B, C and D. Method 600 begins at step 602 wherein user A creates a new electronic mail message 614, for example, a retraction of the mail message previously sent to users B, C and D. At step 604, the method 600 incorporates the prior message from a sent log into the new electronic mail message 614. At step 606, a new text message is appended to the old message, for example, a retraction of the previously sent message. The method 600, at step 608, then sets the e-mail type to "cascade forward" indicating that this message should be cascaded forward to any recipient that had the previous mail message forwarded to them. At step 610, the method 600 sends the retraction e-mail 614 to users B, C and D and, at step 612, the routine exits.

The electronic mail message that is created by the method 600 is shown at 614.

It contains a message ID, for example, A_TS2 that is shown in field 616. The e-mail type is "cascade forward", shown in field 618. The original e-mail message is shown in field 620, and the new message text, which is the retraction, is shown in field 622.

Figure 7:
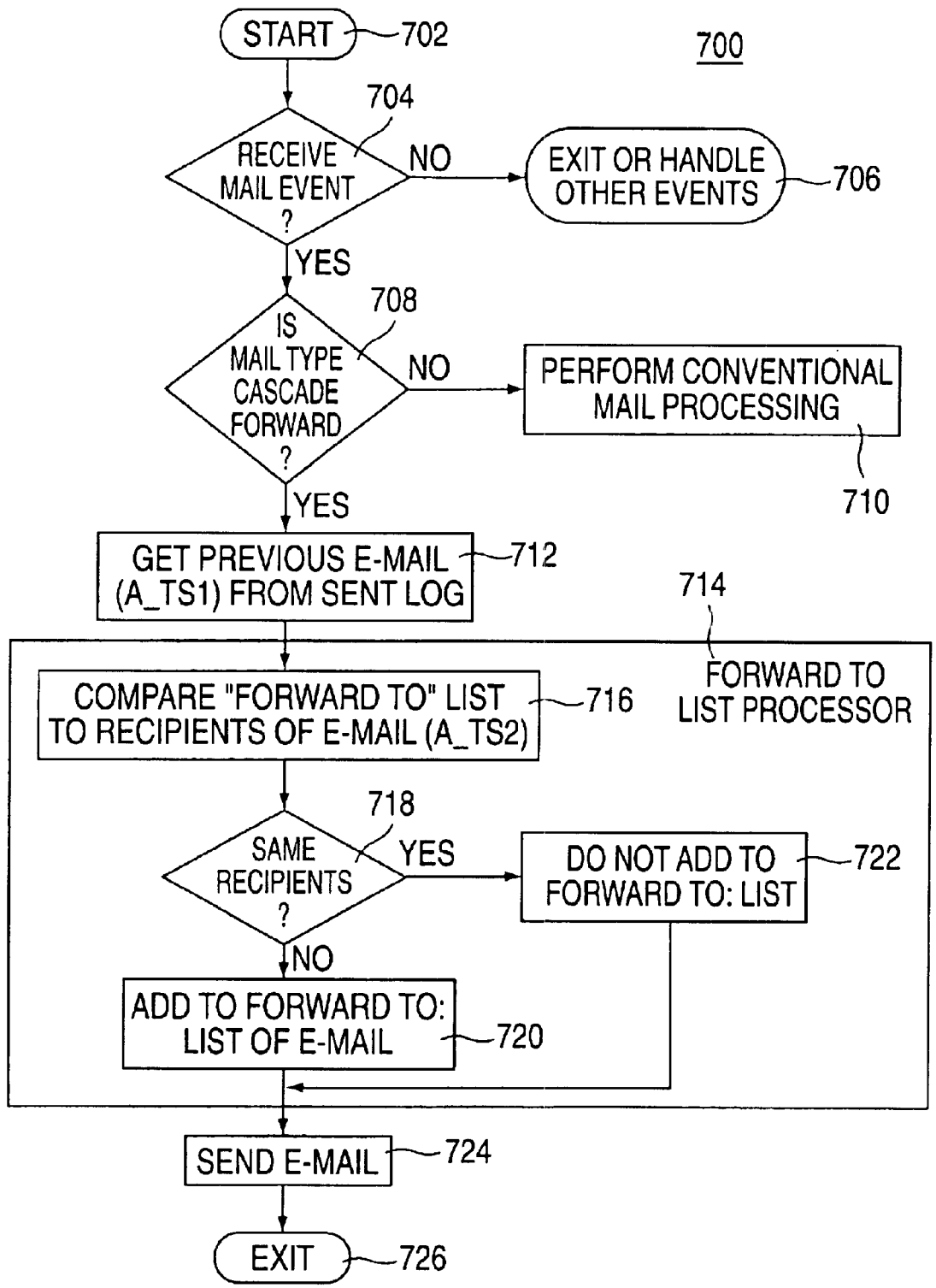
FIG. 7 depicts a flow diagram of a portion of an e-mail program capable of autoforwarding a cascade enabled e-mail message.

FIG. 7 depicts a flow diagram of the operation of a method 700 of user B's electronic mail program when it receives an e-mail message of type cascade forward. The method 700 starts at step 702 and proceeds to step 704 where the routine queries whether a received mail event has occurred. If a received mail event has occurred, routine 700 proceeds from step 704 to step 706 where the method handles other events different from a received mail event or exits. If a received mail event has occurred at step 704, the routine proceeds to step 708 wherein the routine queries whether the mail type is "cascade forward". If the mail type is not cascade forward, then the routine 700 proceeds to step 710 wherein the routine performs conventional mail processing.

If the mail type is "cascade forward", the routine proceeds to step 712 where the previous electronic mail is retrieved from the sent log, for example, mail ID A_TS1. Then the method 700 proceeds to a group of steps that form a "Forward To" list processor 714. The processor 714 starts with step 716 wherein the "Forward To" list is compared to the recipients' list of the new e-mail. The function of the processor 714 is to ensure that a cascade forward e-mail is not repeatedly forwarded to the same users again and again. At step 718, the method 700 queries whether the same recipients appear in both the "Forward To" list and the recipients' list of the new electronic mail, that is, the "Forward To" list in the original sent log of the original electronic mail message. If the query at step 718 is negatively answered and the recipients are not the same, then the recipients of the new e-mail are added to the "Forward To" list of the e-mail that is going to be forwarded from user B's electronic mail program to the people on the "Forward To" list. If the same recipients are found, then they are not added to the "Forward To" list of the new e-mail message at step 722. Once the e-mail is prepared with the proper "Forward To" list, the method 700 sends the electronic mail at step 724 to the users and the program exits at step 726.

In this manner, the electronic mail that was originally sent by A to users B, C and D and then forwarded to users B1, B2 and B3 is now processed such that a retraction, when sent from user A to users B, C and D, would be automatically forwarded by user B to the recipients that received the forwarded e-mail from user B, those being users B2 and B3. Since user B1 does not accept cascade forwarded e-mail. (i.e., step 518 of FIG. 5), user B1 is not sent the cascade forwarded e-mail. Consequently, any retraction sent from a user will ultimately be sent to all of the users that had originally received the message.

Although various embodiments which incorporate the teachings of the present invention have been shown and described in detail herein, those skilled in the art can readily devise many other varied embodiments that still incorporate these teachings.

What is claimed is:

1. A method for processing electronic mail, comprising:

receiving a first electronic mail message having a flag to identify the first electronic mail message as a cascade-type electronic mail message;

forwarding the received first electronic mail message to one or more recipients;

receiving a second electronic mail message;

determining whether the second electronic mail message is a cascade-type electronic mail message related to the first electronic mail message; and when the second electronic mail message is determined as a cascade-type electronic mail message related to the first electronic mail message, determining a forward-to list from the one or more recipients and forwarding the second electronic mail message to the one or more recipients on the forward-to list.

2. The method of claim 1 further comprising:

determining one or more non-cascade-enabled recipients;

removing cascade-type identification information from the second electronic mail message; and forwarding the second electronic mail message to the second electronic mail message without the cascade-type identification information to the one or more non-cascade-enabled recipients.

3. The method of claim 1 wherein the received first cascade-type electronic mail message is addressed to a first recipient and wherein the flag prompts an email program to automatically forward a subsequent email message which is related to the first electronic mail message to the one or more recipients if the subsequent email message is received by the first recipient after the first recipient having forwarded the received first cascade-type electronic mail message.

4. The method of claim 1, further comprising comparing the one or more recipients to a recipient list of the second electronic mail message, wherein the forward-to list is populated with the one or more recipients that are not on the recipient list of the second electronic mail message.

5. A method for providing a cascading electronic mail distribution process, comprising:
   receiving, from a sender, a first electronic mail message identified as a cascade-type message;
   forwarding, in response to a prompt from a user, the first electronic mail message to at least one recipient;
   receiving, from the sender, a second electronic mail message identified as a cascade-type message;
   determining whether the second electronic mail message is related to the first electronic mail message; and
   automatically forwarding the second electronic mail message to the at least one recipient as a result of the first and second electronic mail messages being identified as related cascade-type messages from the same sender.

6. A method for providing a cascade electronic mail distribution process comprising:
   creating a first electronic mail message having a flag identifying the first electronic mail message as a cascade-type message;
   distributing the first electronic mail message to at least one first recipient;
   forwarding the first electronic mail message from the at least one first recipient to at least one second recipient; and
   creating a forwarded mail log that identifies the at least one second recipient in relation with the first electronic mail message;
   creating a second electronic mail message having a cascade forward flag identifying the second electronic message as a cascade forward type message related to the first message;
   distributing the second electronic mail message to the at least one first recipient;
   upon receiving the second electronic mail message by the at least one first recipient, accessing the forwarded mail log to identify the at least one second recipient that received the first electronic mail message; and
   automatically forwarding the second electronic mail message to the identified at least one second recipient.

7. The method of claim 6 further comprising:
   identifying the at least one second recipient in a recipient table, where the at least one second recipient is cascade enabled.

8. The method of claim 6 wherein said accessing step further comprises:
   comparing a list of recipients of the second electronic mail message to said identified at least one second recipient; and
   identifying the at least one second recipient that is not in the list of recipients.

9. The method of claim 6 further comprising:
   determining whether a user accepts cascade-type electronic mail and, if not, sending an electronic message to a sender of a cascade-type electronic mail message that identifies the user as not accepting cascade-type electronic mail.

10. Apparatus for providing cascade electronic mail distribution comprising:
    a first terminal for sending a first cascade-type electronic mail message and a second cascade-type electronic mail message which is related to the first cascade type electronic message through a network; and
    a second terminal for receiving from the first terminal via the network the first cascade-type electronic mail message, forwarding the first cascade-type electronic message to a third terminal, updating a forwarded log with an identification of the third terminal, receiving the second cascade-type electronic message, determining whether the second cascade-type electronic is related to the first cascade-type message, and if related, automatically forwarding the cascade-type electronic mail message to the third terminal.

11. The apparatus of claim 10 wherein the forwarded second cascade-type electronic mail message comprises the first cascade-type electronic mail message from said first terminal and additional message information from said second terminal.

12. The apparatus of claim 10 wherein each of the first and second cascade-type electronic mail message comprises:
    a message identification;
    a recipients field;
    a message type field that identifies a cascade feature of the electronic mail message; and
    a message field.

13. The apparatus of claim 12 wherein the message identification comprises a user name and a time-stamp.

14. The apparatus of claim 12 wherein the message type field is a cascade enable field.

15. The apparatus of claim 12 wherein the message type field is a cascade-forward enable field.

16. The apparatus of claim 12 wherein the second cascade-type electronic mail message further comprises a previous message field.

17. Apparatus for processing electronic mail comprising:
    an electronic mail processor configured to perform a method comprising:
      receiving a first electronic mail message having a flag to identify the first electronic mail message as a cascade-type electronic mail message;
      forwarding the received first cascade-type electronic mail message to one or more recipients;
      receiving a second electronic mail message;
      determining whether the second electronic message is a cascade-type electronic mail message related to the first electronic mail message; and
      when the second electronic mail message is determined as a cascade-type electronic mail message related to the first electronic mail message, determining a forward-to list from the one or more recipients and forwarding the second electronic mail message to the one or more recipients on the forward-to list.

18. The apparatus of claim 17, wherein the electronic mail processor is configured to perform the method further comprising:
    determining one or more non-cascade-enabled recipients;
    removing cascade-type identification information from the second electronic mail message; and
    forwarding the second electronic mail message to the second electronic mail message without the cascade-type identification information to the one or more non-cascade-enabled recipients.

19. The apparatus of claim 18 wherein the second electronic mail message comprises a retraction of the first electronic mail message.

20. A computer readable medium comprising software that, when executed by a general purpose computer, causes said general purpose computer to perform a method comprising:

receiving an electronic mail message having a flag to identify the electronic mail message as a cascade-type electronic mail message;

forwarding the received first cascade-type electronic mail message to one or more recipients;

receiving a second electronic mail message;

determining whether the second electronic message is a cascade-type electronic mail message related to the first electronic mail message; and when the second electronic mail message is determined as a cascade-type electronic mail message related to the first electronic mail message, determining a forward-to list from the one or more recipients and forwarding the second electronic mail message to the one or more recipients on the forward-to list.

21. The computer readable medium of claim 20 wherein the method further comprises:

determining one or more non-cascade-enabled recipients;

removing cascade-type identification information from the second electronic mail message; and forwarding the second electronic mail message to the second electronic mail message without the cascade-type identification information to the one or more non-cascade-enabled recipients.

22. The computer readable medium of claim 20, further comprising a data structure of an electronic mail message comprising:

a message identification;

a recipients field;

a message type field that identifies a cascade feature of the electronic mail message; and a message field.

23. The computer readable medium of claim 22 wherein the message identification comprises a user name and a time-stamp.

24. The computer readable medium of claim 22 wherein the message type field is a cascade enable field.

25. The computer readable medium of claim 22 wherein the message type field is a cascade-forward enable field.

26. The computer readable medium of claim 22 further comprises a previous message field.

27. The method of claim 1, further comprising:

before receiving the first electronic mail message, determining whether the first electronic mail message is a cascade-type electronic mail and determining whether an electronic mail program has enabled acceptance of cascade-type electronic mail; and when the first electronic mail message is determined as a cascade-type electronic mail and the electronic mail program is determined as non-cascade enabled, rejecting the first electronic mail message.

* * * * *